United States Patent [19]

Kamimura

[11] 4,409,442

[45] Oct. 11, 1983

[54] HEADPHONE

[75] Inventor: Tomohiko Kamimura, Habikino, Japan

[73] Assignee: Hosiden Electronics Co., Ltd., Osaka, Japan

[21] Appl. No.: 259,223

[22] Filed: Apr. 30, 1981

[30] Foreign Application Priority Data

May 12, 1980 [JP] Japan ............................ 55-64684[U]

[51] Int. Cl.$^3$ ............................................. H04M 1/05

[52] U.S. Cl. .......................... 179/156 R; 179/182 R; 179/178

[58] Field of Search .................. 179/156 R, 178, 179, 179/182 R, 1 ST, 156 A; 181/135, 130, 131

[56] References Cited

U.S. PATENT DOCUMENTS

| | | | |
|---|---|---|---|
| 3,272,926 | 4/1963 | Falkenberg | 179/182 |
| 3,532,837 | 10/1970 | Dyar et al. | 179/156 |
| 3,772,478 | 11/1973 | McCabe et al. | 179/1 ST |
| 3,864,756 | 2/1975 | Desimone | 2/6 |
| 4,048,453 | 9/1977 | Seidel | 179/156 R |
| 4,302,635 | 11/1981 | Jacobsen et al. | 179/156 R |

FOREIGN PATENT DOCUMENTS

| | | | |
|---|---|---|---|
| 108696 | 1/1928 | Fed. Rep. of Germany | 179/156 |
| 723955 | 12/1939 | Fed. Rep. of Germany | 179/156 |
| 909106 | 6/1951 | Fed. Rep. of Germany | 179/156 |
| 2132817 | 1/1972 | Fed. Rep. of Germany | 179/156 R |

*Primary Examiner*—G. Z. Rubinson
*Assistant Examiner*—Robert Lev
*Attorney, Agent, or Firm*—Pollock, Vande Sande & Priddy

[57] ABSTRACT

First ends of first and second band pieces with a shape of a circular arc are rotatably connected with each other such that the angle formed therebetween is prevented from exceeding a predetermined angle. End pieces are slidably mounted respectively on the other ends of the first and second band pieces along the direction of extension thereof and receivers of the headphone are mounted on the respective ends of the end pieces.

2 Claims, 13 Drawing Figures

HEADPHONE

BACKGROUND OF THE INVENTION

The present invention relates to a headphone of the type comprising two main bodies, namely, receivers each having a built-in transducer for converting an electric signal into a sound signal which are connected to one another by a headphone band and held to the ears over the head while in use.

A conventional headphone band is formed by a band-like resilient member, both ends of which are provided with a headphone receiver. The conventional headphone does not allow the position of the main body of the headphone to be properly adjusted according to a shape of the user's head or hair style and, also, it is sometimes difficult to construct the headphone so as to be fitted to both ears at a proper position and with an appropriate pressure, resulting in inconvenience for use. In addition, the conventional headphone has the disadvantages that it occupies a relatively large space for the storing or transporting thereof, cannot be folded, and is not handy to carry.

An object of the present invention is to provide a headphone which is adapted to be folded, and, therefore, reduces expenses related to the storage or transport thereof, and which is very easy to carry because of the small space required for storage thereof.

Another object of the present invention is to provide a headphone which allows the position of a main body of the headphone relative to the head, when held to the ears, to be adjusted and allows the headphone to be folded into a small size.

A further object of the present invention is to provide a headphone constructed in such a manner that it can readily be folded into a small size, and, when unfolded, retains its unfolded shape.

SUMMARY OF THE INVENTION

According to the present invention the headphone comprises a band which is constructed in such a manner that a first band piece and a second band piece, each fabricated of a resilient material, are connected with each other at first ends thereof, the connection between the first band piece and the second band piece being such that the entire band can be folded double in the plane of the headphone band. A first end piece and a second end piece are slidably mounted along the band pieces on the other ends of said first and second band pieces, respectively. Main bodies of a first headphone and a second headphone are mounted on these first and second end pieces respectively. By folding the first band piece and the second band piece relative to each other, the headphone band can be folded double, thereby reducing the space occupied by the headphone. In this case, by sliding the first end piece and the second end piece along the first band piece and the second band piece respectively to approach each other, the space occupied by the headphone can be further reduced. Moreover, by sliding the first end piece and the second end piece with respect to the first band piece and the second band piece, the positions of the main bodies of the headphone relative to the head can be adjusted while the headphone is held on the head.

In an alternative embodiment of the invention, the first band piece and the second band piece are connected in such a manner that connecting portions thereof can move relative to each other approximately in parallel to an axis around which both band pieces are folded. One of the band pieces is urged against the other band piece by a bias means which exerts a force parallel to the direction of the folding axis. When engagement portions of the band pieces are moved into engagement with one another by the bias force, the two band pieces are prevented from folding about the aforementioned axis. On the other hand, when one of the band pieces is displayed with respect to the other band piece against the bias force, the engagement between the two band pieces is released and the band pieces can then be folded relative to each other. In the headphone constructed in this way, when the first band piece and the second band piece are unfolded for use, the unfolded position is fixedly maintained by the aforementioned engaging portions, allowing easy handling of the headphone in placing it on or removing it from the head.

DETAILED DESCRIPTION OF THE PREFERRED EMBODIMENTS

Figure 1:
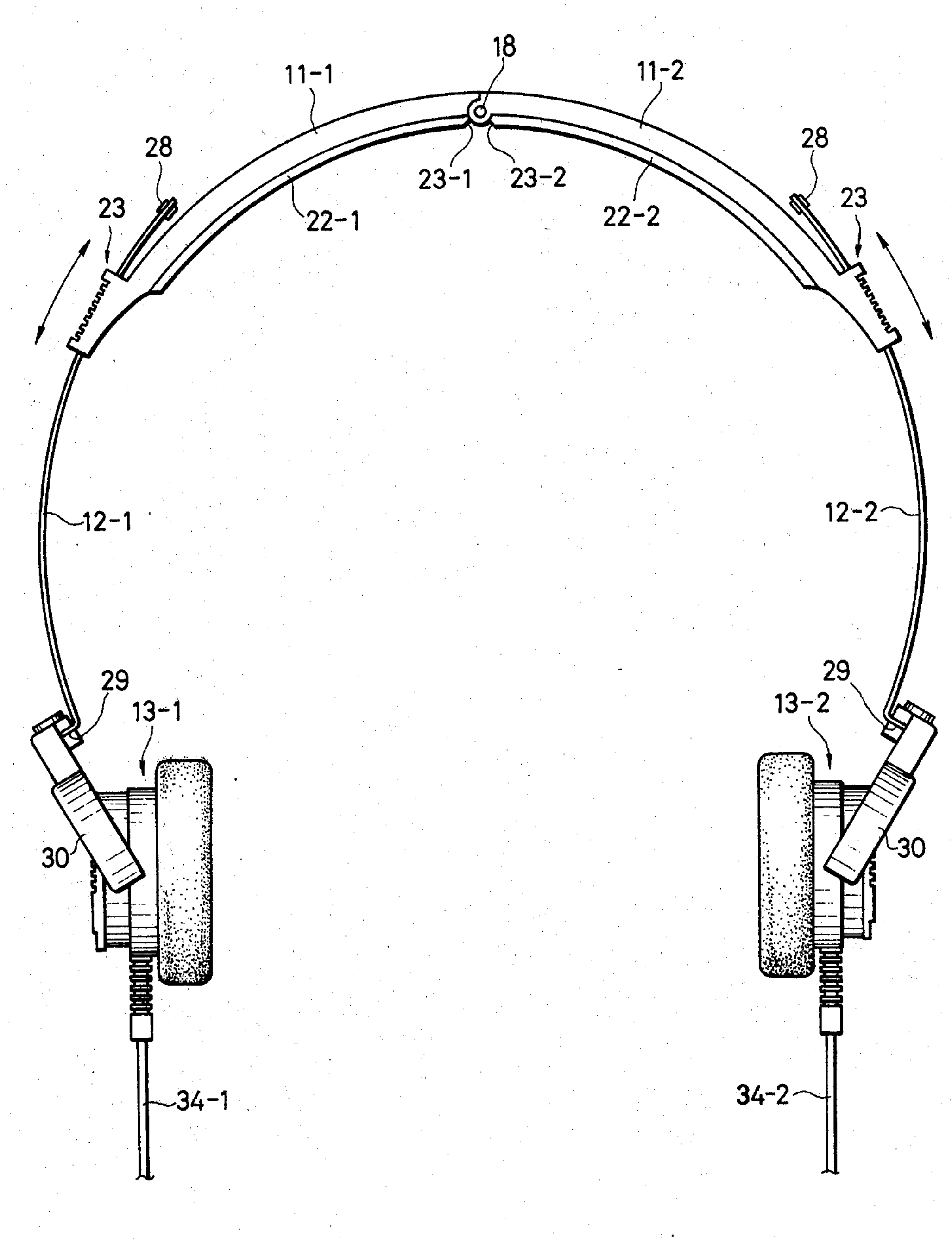
FIG. 1 is a front view of one example of a headphone according to the present invention.
Figure 2:
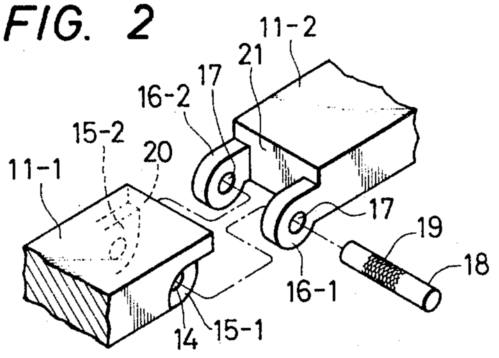
FIG. 2 is a disassembled perspective diagram showing one example of coupling means for band pieces of the headphone.

FIG. 1 shows a state where one example of a headphone according to the present invention is unfolded for use. Respective ends of a first band piece 11-1 and a second band piece 11-2, each of which is made of a resilient material such as a synthetic resin and provided with the shape of a circular arc are rotatably interconnected with each other by means of a connecting shaft 18. The first and second band pieces 11-1 and 11-2 have gentle curvature along a common circular arc with the width of each band piece extending perpendicular to the plane defined by the circular arc. The connecting shaft 18 between the band pieces extends in the widthwise direction of said band pieces. Head pads 22-1 and 22-2 made, for example, of urethane are provided, on the inside surfaces of the first and second band pieces 11-1 and 11-2 so that the headband, in its unfolded configuration, fits softly over the head. As shown in FIG. 2 a supporting hole 14 is formed in the width direction of the band pieces to penetrate an end portion of the first band piece 11-1 on the side thereof opposing the second band piece 11-2. The opposing sides of the first band piece 11-1 are partly shaved off at the both ends of the supporting hole 14 to form recesses 15-1 and 15-2. Coupling pieces 16-1 and 16-2 positionally correspondingly to the recesses 15-1 and 15-2 are formed as a unitary structure on the end surface of the second band piece 11-2 to project therefrom towards the connecting side of the first band piece 11-1. Mounting holes 17 with a diameter approximately equal to that of the supporting hole 14 are formed respectively in the coupling pieces 16-1 and 16-2 on an extended line of the supporting hole 14.

Figure 3A:
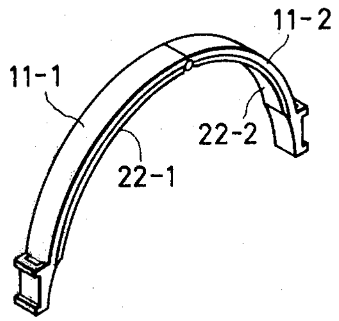
FIG. 3A is a perspective diagram illustrating a state where the band portion of the headphone is unfolded.
Figure 3B:
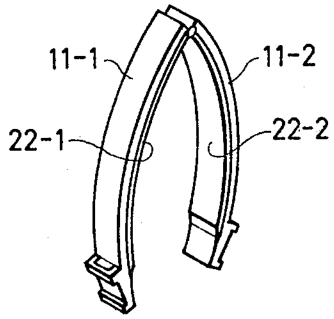
FIG. 3B is a perspective diagram showing a state where the band portion of the headphone is folded.

The connecting shaft 18 is inserted into these supporting hole 14 and mounting holes 17. The outer periphery of the central portion of the connecting shaft 18, has engraved knurls 19 thereon, a portion of which is pressed into the supporting hole 14 to fix the connecting shaft 18 in the supporting hole 14 by friction. The opposite ends of the connecting shaft 18 projecting out from the supporting hole 14 are loosely inserted into each of the mounting holes 17 of the respective coupling pieces 16-1 and 16-2. In this way, the first and second band pieces 11-1 and 11-2 are rotatably connected by the connecting shaft 18. The band pieces 11-1 and 11-2 are arranged in such a manner that the angle between the band pieces 11-1 and 11-2 cannot be larger than that formed when the band pieces 11-1 and 11-2 are positioned on an approximately common circular arc as shown in FIG. 1. For example, it is arranged that an outer portion, with respect to said circle, of the end surface 21 of the second band piece 11-2 opposed to the first band piece 11-1 is brought into contact with an end surface 20 of the first band piece 11-1. The connection between the first and second band pieces 11-1 and 11-2 is such that the inner peripheral surfaces of the recesses 15-1 and 15-2 are frictionally contacted by the outer peripheral surfaces of the coupling pieces 16-1 and 16-2, the frictional forces between these surfaces being sufficient to maintain the angle between the first and second band pieces when the headphone is unfolded. FIG. 3A and FIG. 3B show two states where the band pieces 11-1 and 11-2 are unfolded and folded respectively.

Figure 4:
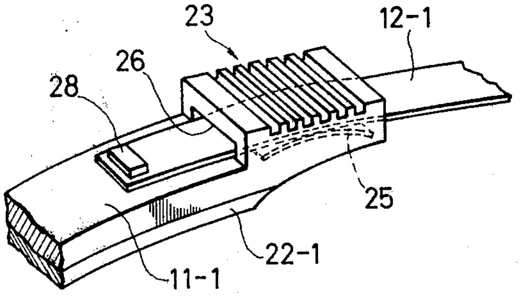
FIG. 4 is a perspective diagram illustrating a slidable coupling portion between a band piece and an end piece.

As shown in FIG. 1, at the end portion of the first band piece 11-1 opposite from the end thereof connecting with the second band piece 11-2, there is slidably mounted a first end piece 12-1 which extends along the direction of extension of the first band piece 11-1. More particularly, at the end portion of the first band piece 11-1 remote from the connection to the second band piece 11-2, there is a coupling pipe 23 having a rectangular section, formed as a unitary structure with the first band piece 11-1, which extends along the outer periphery of the circular arc as shown in FIG. 4. The first end piece 12-1, having the shape of a circular arc and made, for example, of a band-like metal resilient material, is movably inserted into the coupling pipe 23 along the outer peripheral surface of the first band piece 11-1. In order to maintain a relative position between the first end piece 12-1 and the first band piece 11-1, there is provided resilient holding means which allows the position of the first end piece 12-1 to be adjusted in the direction along the first band piece 11-1, and to hold the adjusted position. For example, as the biasing means, a metal spring leaf 25 biasing the first end piece 12-1 against the interior surface of the coupling pipe 23 is mounted between the opposite interior surface of the coupling pipe 23 and the first end piece 12-1. The biasing means need not necessarily be a metal leaf spring 25, but may be a projection made of an elastic material. Therefore, the position of the first end piece 12-1 in the lengthwise direction can be adjusted with respect to the coupling pipe 23 of the first band piece 11-1 to set a suitable length of the headphone band.

Figure 5:
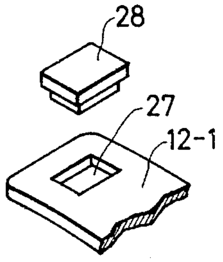
FIG. 5 is a disassembled perspective diagram showing a part of the end piece and a stop piece to be mounted thereon.

As shown in FIG. 5, near the end portion of the first end piece 12-1 projecting out from the coupling pipe 23 on the side of the band piece 11-1, there is formed a rectangular mounting hole 27 into which a stop piece 28 is fitted. The stop piece 28 prevents the first end piece 12-1 from coming off from the coupling pipe 23.

Figure 6A:
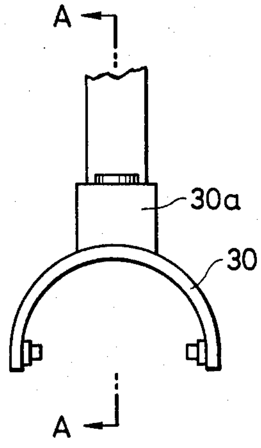
FIG. 6A is a diagram illustrating a semi-circular arm and an associated lug.
Figure 6B:
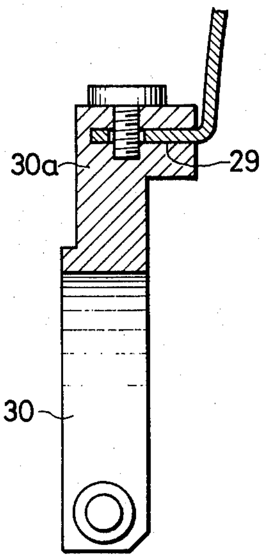
FIG. 6B is a sectional view taken on line A—A in FIG. 6A.

As shown in FIG. 1, FIG. 6A and FIG. 6B, a main body of a headphone 13-1 is mounted on the end portion of the first end piece 12-1 on the side opposite the stop piece 28. For example, the end portion of the first end piece 12-1 is bent outwardly to form approximately a right angle to the first end piece 12-1, thus forming a lug portion 29. A supporting fork 30 having the shape of a semi-circle is provided with a shank **30*a* at its middle portion which is rotatably mounted to the lug portion 29. The main body of the headphone 13-1 is attached between both end portions of the semi-circular supporting fork 30 so as to be rotatable around a straight line axis extending between said both end portions. Thus, the fork 30 is rotatable on the lug 29 about an axis lying in a plane formed by the circular configuration of the headphone band as a whole, while the main body of the headphone 13-1 is rotatably adjustable around the axis of the straight line connecting both end portions of the semi-circular fork 30**. Accordingly, both rotations allow the orientation of the main body of the headphone to take any angle suitable to fit the head.

By means of an analogous construction, a second end piece 12-2 is mounted slidably along the circular arc of the second band piece 11-2, and, the second end piece 12-2 is attached to a second main body 13-2 of the headphone in such a manner that the orientation thereof is adjustable. Transducers for converting an electric signal to an acoustic signal are contained in the first and second main bodies of the headphone 13-1 and 13-2 respectively, though they are not shown in the drawings. Cords 34-1 and 34-2 for feeding an electric signal to the transducers are connected to the main bodies 13-1 and 13-2 respectively.

Figure 8:
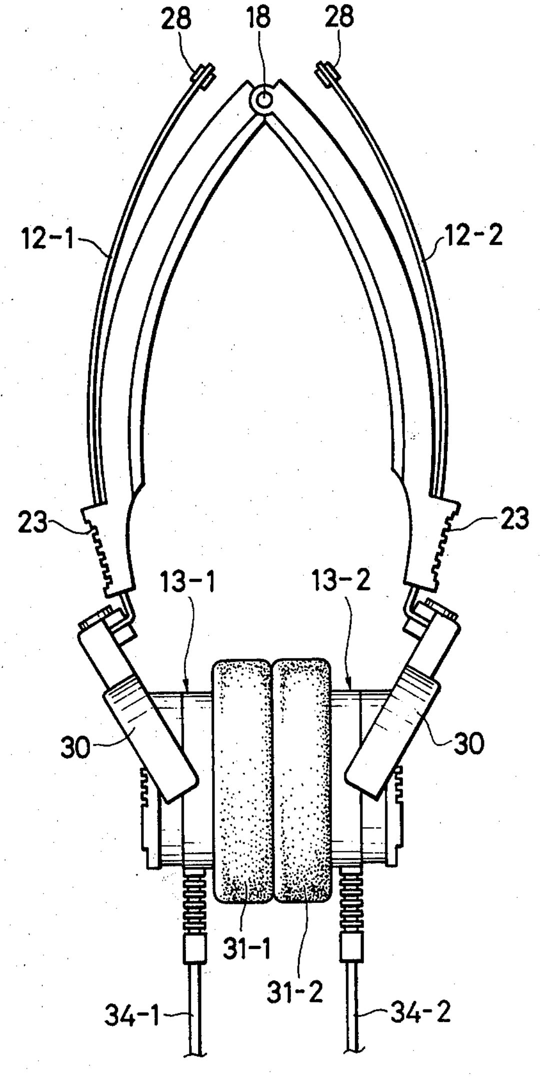
FIG. 8 is a front view illustrating a folded position of the headphone shown in FIG. 1.

The abovesaid construction allows the headphone to be folded in a small size. In other words, if the first and second end pieces 12-1 and 12-2 are moved along the first and second band pieces in such a manner that the stop pieces 28 approach each other, the respective lug portions 29 are situated near the coupling pipes 23, and then, if the first and second band pieces 11-1 and 11-2 are made to rotate around the connecting shaft 18 so as to approach each other, the main bodies 13-1 and 13-2 of the headphone approach and face each other, allowing ear pads made, for example, of urethane covering the respective main bodies of the headphones to be brought in contact with each other as shown in FIG. 8. Accordingly, it is possible to hold the folded structure stably. The space occupied by the folded structure of the headphone is about one fourth that of the unfolded structure of the headphone. Particularly, when the first and second band pieces 11-1, 11-2 and the first and second end pieces 12-1, 12-2 are all designed to have almost the same size and curvature, the space occupancy of the folded structure of the headphone can be considerably reduced.

Figure 7:
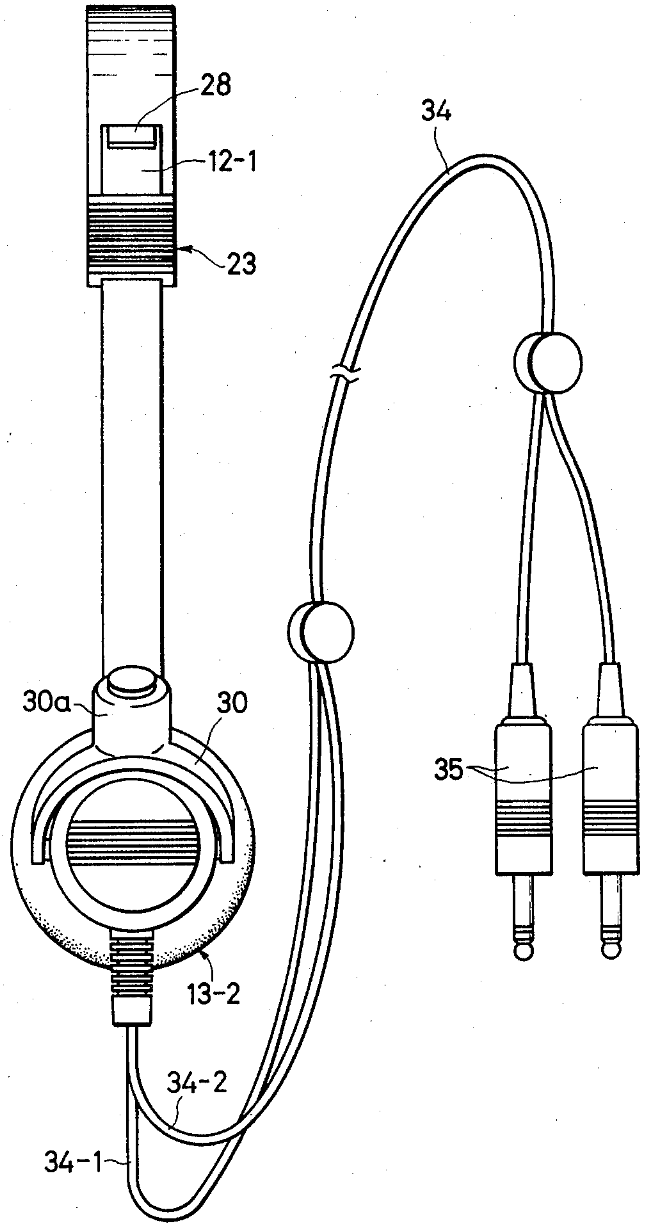
FIG. 7 is a side view illustrating cords and plugs connected with the headphone shown in FIG. 1.
Figure 9:
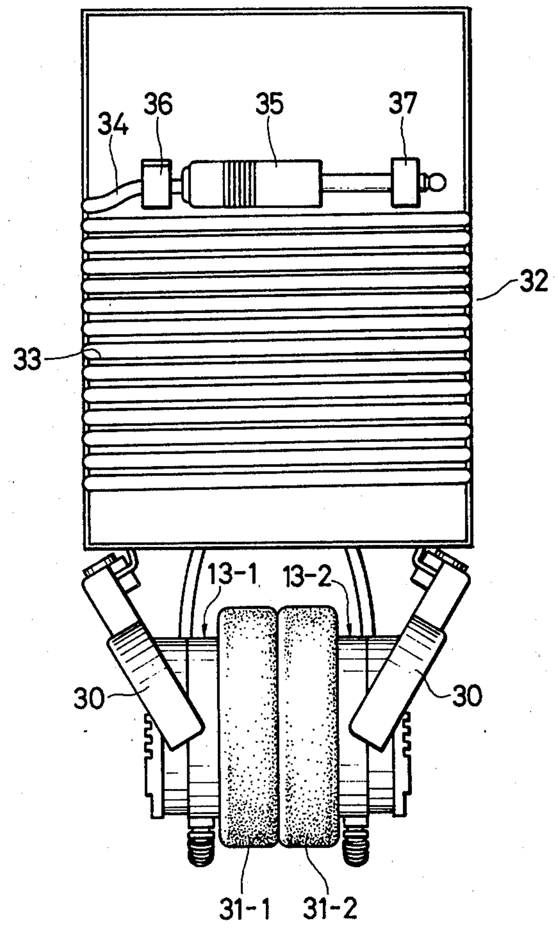
FIG. 9 is a front view of the headphone shown in FIG. 8 accommodated in a container.

As shown in FIG. 9, the folded band pieces of the headphone are accommodated in a container 32 having the configuration of a rectangular box with one end face open to receive the folded band pieces. Fitting grooves 33 are formed in parallel to each other around the outer surfaces of the container 32. As shown in FIG. 7, a cord 34 formed by the bundled cords 34-1 and 34-2 is wound around the container 32 along the fitting grooves 33 so as to fit therein. A plug 35 of the cord 34 is resiliently clamped between elastic supporting pieces 36 and 37 and the face of the container 32. In the case of a stereo-headphone, an end of the cord 34 is branched into two cords corresponding to the cords 34-1 and 34-2 and the plugs 35 are provided on the respective cords, thus allowing the two plugs 35 to be mounted on the front face and the rear face of the container 32, respectively. In this way, the first and second band pieces 11-1 and 11-2 and the first and second end pieces 12-1 and 12-2 are accommodated inside the container 32, and only the main bodies of the headphone confronting with each other via ear pads 31-1 and 31-2 and the supporting forks 30 project out from the open side of the container.

Figure 10:
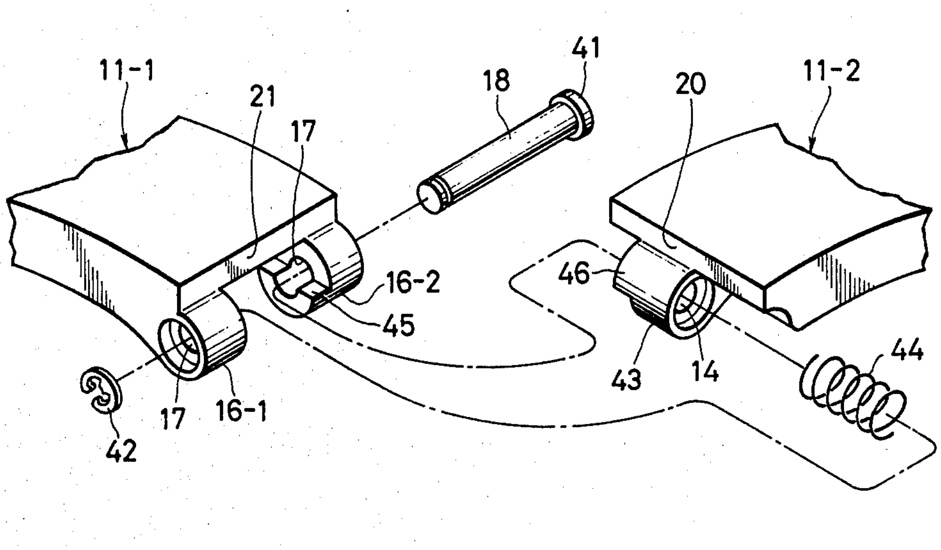
FIG. 10 is a disassembled perspective diagram illustrating another example of connecting means.
Figure 11:
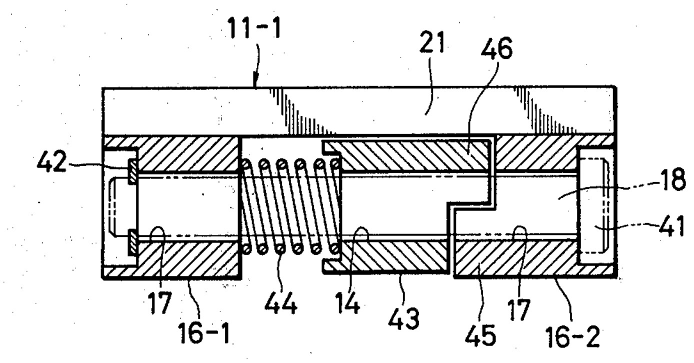
FIG. 11 is a sectional view of the connecting means shown in FIG. 10.

FIG. 10 and FIG. 11 show another example of the connecting means between the band pieces 11-1 and 11-2. In this example, a pair of coupling pieces 16-1 and 16-2 are formed as a unitary structure with the band piece 11-1 and the supporting hole 14 is formed on the band piece 11-2. At one end of the connecting shaft 18 is formed a collar 41 as a unitary structure and the other end thereof is fitted with a snap ring 42 to prevent the shaft 18 from coming out. The connecting shaft 18 is made rotatable with respect to either of the band pieces 11-1 and 11-2. The band pieces 11-1 and 11-2 are slidable along the connecting shaft 18 and are urged to their limit positions on the connecting shaft 18 by a bias means. In other words, a gap is provided between a hole forming portion 43 forming therein the supporting hole 14 of the band piece 11-2 and the coupling piece 16-1. A coil spring 44 is loosely wound on the connecting shaft 18 between the hole forming portion 43 and the coupling piece 16-1, and the hole forming portion 43 is urged to the side of the other coupling piece 16-2 by the coil spring 44 to contact the coupling piece 16-2. When the band pieces 11-1 and 11-2 are in their unfolded state, the coupling piece 16-2 engages with the hole forming portion so as to prevent relative rotation between them, thus maintaining the unfolded state. If the band pieces 11-1 and 11-2 are moved against the biasing force of the spring 44, the engagement of the coupling means is released, thus allowing the band pieces 11-1 and 11-2 to be rotatably moved with respect to each other. As an example of such engaging means, a stepped portion 45 having the shape of a short semi-circular pipe is projected as a unitary structure from the end surface of the coupling piece 16-2 at the side toward the hole forming portion 43, and a stepped portion 46 having the shape of a short semi-circular pipe is formed as a unitary structure from the end surface of the hole forming portion at the side toward the coupling piece 16-2. When the band pieces 11-1 and 11-2 are unfolded to form the maximum angle therebetween, the end faces of the stepped portions 45 and 46 approach each other, that is, the stepped portions 45 and 46 engage with each other, thus not allowing the band pieces 11-1 and 11-2 to be rotatably moved relative to each other. The unfolded state, that is, the condition for use is, therefore, maintained to provide easy operation for fitting the headphone to the head. Relative movement of the band pieces 11-1 and 11-2 against the biasing force of the spring 44 releases the engagement between the stepped portions 45 and 46, allowing the band pieces 11-1 and 11-2 to be rotatably moved relative to each other.

As has been described above, the headphone according to the present invention allows the headphone bands to be folded, the space occupied by the headphone as a whole to be made small, expenses required to store and transport thereof to be reduced and the headphone to be made easy to carry. Also, when using the headphone, by sliding the end pieces 12-1 and 12-2 relative to the band pieces 11-1 and 11-2, the positions of the main bodies (13-1 and 13-2) of the headphone held on the head can be adjusted, resulting in good fitting to the head. In the case where the band pieces 11-1 and 11-2 are held unfolded by the coupling means, fitting operation to the head can be made easily.

I claim:

1. A headphone comprising a first resilient band piece of arcuate shape having first coupling means at one end thereof; a second resilient band piece having second coupling means at one end thereof, said second band piece having the same length, width, thickness and shape as said first band piece; connecting means for connecting the other ends of said first and second band pieces to one another with the arcuate shapes of said band pieces lying in a common plane, said connecting means comprising a coupling portion projecting from said other end of said first resilient band piece and having a hole extending therethrough in a direction perpendicular to said common plane, a pair of spaced coupling pieces projecting from said other end of said second resilient band piece in facing relation to the opposing ends of said coupling portion, each of said pair of coupling pieces having a hole therein in alignment with the hole in said coupling portion, a shaft extending through the holes formed in said coupling portion and in said pair of coupling pieces whereby said first and second band pieces can be angularly displaced relative to one another in said common plane about said shaft, the spacing between said pair of coupling pieces being significantly greater than the axial extent of said coupling portion in a direction parallel to said shaft whereby said first and second band pieces can be moved relative to one another along said shaft, bias means comprising a coil spring wound about said shaft between one of said pair of the coupling pieces and said coupling portion for urging said coupling portion along said shaft into engagement with one of said coupling pieces, said coupling portion and said one of said coupling pieces having stepped portions which define planes that extend transverse to said shaft and which are moved into engagement with one another by the biasing force of said coil spring to prevent angular displacement of said band pieces relative to one another about said shaft, said planes being disengaged from one another, to permit relative angular displacement of said band pieces about said shaft, by movement of said coupling portion and said one of said coupling pieces away from one another along said shaft against the biasing force exerted by said coil spring; a first end piece having a length approximately equal to that of said first resilient band piece, said first end piece being slidably coupled with said first coupling means so that substantially the entire length of the first end piece is slidable along said first resilient band piece; a second end piece of the same material, shape, length, width and thickness as said first end piece, said second end piece being slidably coupled with said second coupling means so that substantially the entire length of said second end piece is slidable along said second resilient band piece; and first and second headphone members each of which is covered by an ear pad and each of which includes a transducer for converting an electric signal into an acoustic signal, said first and second headphone members being respectively mounted on said first and second end pieces at positions remote from said connecting means such that when said first and second end pieces are slid relative to their respective coupling means until said headphone members reach said first and second coupling means, respectively, said first and second headphone members are brought into contact with each other through said covering ear pads.

2. A headphone according to claim 1 wherein said first and second end pieces are each made to have an arcuate shape having a curvature substantially the same as those of said first and second resilient band pieces, respectively.

* * * * *